United States Patent Office 2,954,983
Patented Oct. 4, 1960

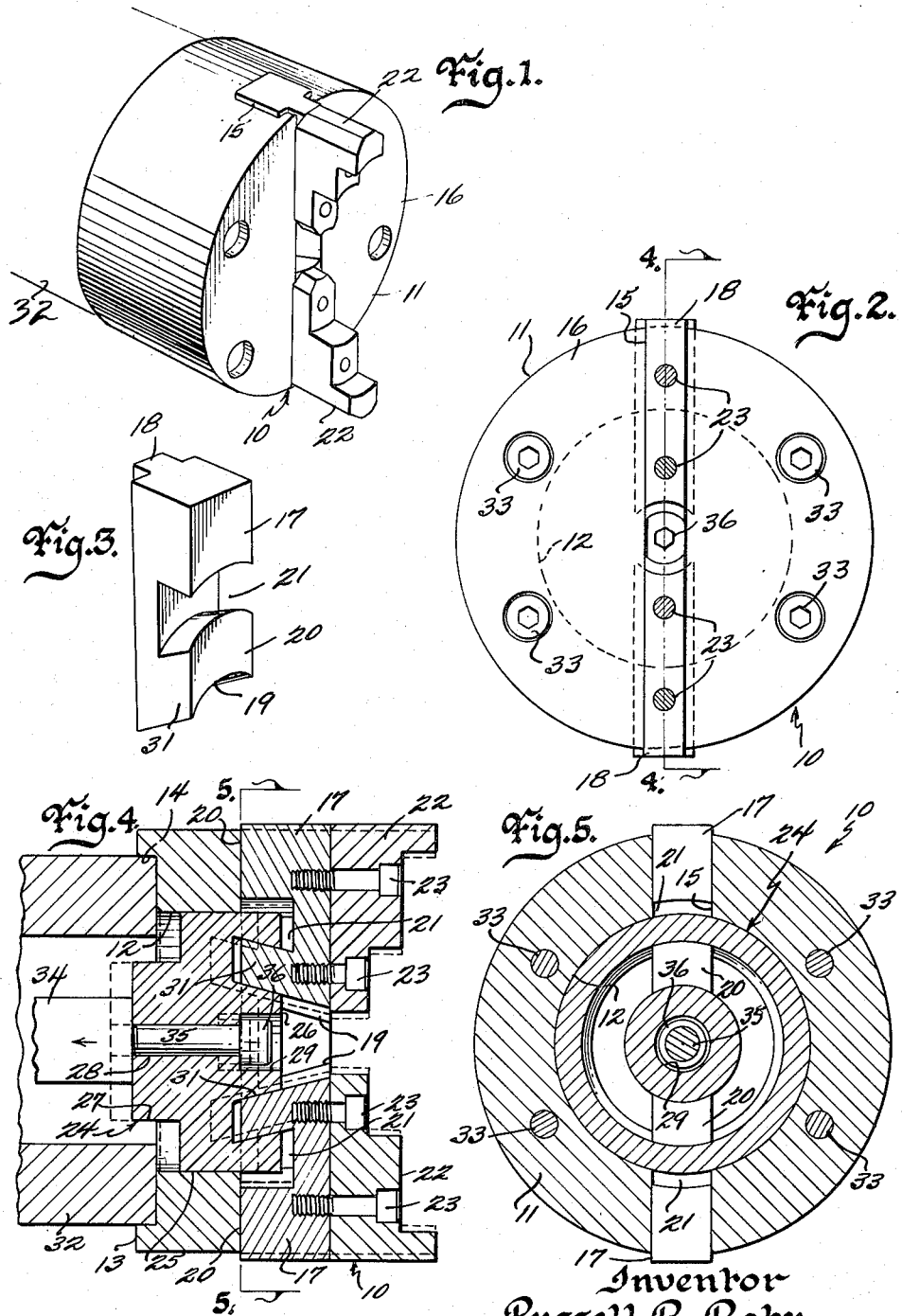

2,954,983

POWER CHUCK

Russell R. Roby, Truro, Iowa

Filed Oct. 31, 1958, Ser. No. 770,961

3 Claims. (Cl. 279—121)

The present invention relates to power chucks and particularly to power chucks of the type used on lathes, automatic chucking machines and all other machines requiring or on which a power chuck can be used.

The primary object of the invention is to provide a power chuck in which the friction between the master jaw ring, chuck body and jaws is virtually eliminated, while maintaining the power of the chuck.

Another object of the invention is to provide a power chuck of the class described above in which the master jaw ring is moved longitudinally in a direction away from the jaws to tighten the jaws.

A further object of the invention is to provide a power chuck of the class described above in which the power operator for the jaws is positioned remote from the jaws and actuates the jaws through an axially movable member.

A still further object of the invention is to provide a power chuck of the class described above having a minimum of moving parts whereby the frictional resistance to the movement of the parts is materially reduced and the cost of construction of the chuck is substantially less than that of conventional chucks.

Other objects and advantages will become apparent in the following specification when considered in the light of the attached drawings, in which:

Figure 1 is a perspective view of the invention.

Figure 2 is an enlarged end elevation of the invention with the false chuck jaws removed.

Figure 3 is a perspective view of one of the master jaws removed from the chuck.

Figure 4 is a fragmentary vertical sectional view taken along the line 4—4 of Figure 2, looking in the direction of the arrows.

Figure 5 is a transverse sectional view taken along the line 5—5 of Figure 4, looking in the direction of the arrows.

Referring now to the drawings in detail wherein like reference characters indicate like parts throughout the several figures, the reference numeral 10 indicates generally a power chuck constructed in accordance with the invention.

The power chuck 10 comprises a cylindrical body 11 having an axial bore 12 opening through the rear end 13 thereof. The bore 12 has a recessed rear end 14, for reasons to be assigned. The body 11 is provided with a transversely extending T-shaped slot 15 extending radially therethrough and intersecting the forward end 16 thereof.

A pair of master jaws 17 are slidably arranged in opposite ends of the T-shaped slot 15 and are each provided with a reduced cross section forward extension 18, for reasons to be assigned. The master jaw 17 has a formed circular recess at 21 with outer edge of recess 21 formed at 90° angle from face of master jaw 17, with inner edge of recess 21 formed at less than 90° angle from face of master jaw 17. Master jaws 17 also have formed circular cones on inner ends 19 at same angle as inner edge of recess 21. The master jaws 17 are radially slidable in the T-shaped slot 15 and have false jaws 22 secured thereto by means of securing elements 23. The false jaws 22 are secured to the extension 18 of the master jaw 17 and extend beyond the forward end 16 of the body 11.

A master jaw ring, generally indicated at 24, has a cylindrical body 25 terminating in a forward radial face 26 and a rear reduced extension 27. As appears in Figure 4, master jaw ring 24 is of unitary construction and cup-like in shape. An axial bore 28 extends through the body 25 and has an enlarged forward end portion 29 communicating therewith.

The master jaw ring 24 is provided with an annular slot 30 opening through the forward radial face 26. The annular slot 30 slopes radially outwardly from the axial center of the master jaw ring 24 so that a segmental master jaw follower 31 may engage therein. The master jaw follower 31 is integrally formed on the master jaw 17 between the formed circular cone 19 and the recess 21, as best shown in Figure 3.

Longitudinal movement of the annular master jaw ring 24 effects a radial sliding movement of the master jaw 17 in the T-slot 15 so that the false jaws 22 are moved together and apart to clamp a work piece therebetween or release it therefrom selectively. The body 11 of the chuck 10 is secured to a hollow spindle 32 by means of a plurality of bolts 33, as shown in Figures 2 and 5. The hollow spindle 32 is seated in the recessed rear end 14 of the bore 12, as best shown in Figure 4. A shaft 34 extends through the hollow spindle 32 and contacts the reduced extension 27 of the master jaw ring 24. A bolt 35 extends through the bore 28 in the master jaw ring 24 and has a head 36 which engages in the enlarged forward end 29 of the bore 28 to secure the master jaw ring 24 to the shaft 34. Means (not shown) are provided at the opposite end of the spindle 32 to move the shaft 34 axially of the spindle 32 so as to axially move the master jaw ring 24 as required.

The means for moving the shaft 34 can be power operated if required and any number of the master jaws 17 may be mounted in the body 11 in a plurality of T-slots 15 so as to provide a plurality of false jaws 22 when required.

It should be understood that the master jaw 17 and the master jaw ring 24 may have the angle of the slot 30 and the follower 31 reversed when required to provide an internal gripping chuck.

Having thus described the preferred embodiment of the invention, it should be understood that numerous structural modifications and adaptations may be resorted to without departing from the scope of the appended claims.

What is claimed is:

1. A chuck comprising a cylindrical body, a unitary, cup-like, master jaw ring mounted for longitudinal sliding movement in said body, said body having a transverse radially extending T-shaped slot formed therein, a pair of master jaws arranged in said T-shaped slot for opposite radial sliding movement therein, a follower formed on each of said master jaws, said followers lying within a longitudinal projection of said master jaws, said master jaw ring having an arcuate slot formed therein with said followers engaged in said slot to move said master jaws radially upon longitudinal movement of said master jaw ring and a false jaw detachably secured to each of said master jaws and means secured to the center rear of said master jaw ring for moving it longitudinally.

2. A chuck comprising a body, a master jaw ring mounted for axial sliding movement in said body, said body having transverse T-shaped slots formed therein extending radially through the periphery thereof, master jaws arranged in said T-shaped slots for sliding movement therein, a curved recess having a sloping side wall formed in each of said master jaws, said master jaw ring having an arcuate recess having a sloping side formed therein; the sloping sides of said master jaw grooves engaged against the sloping side of the recess of said master jaw ring; whereby axial movement of said master jaw ring causes radial sliding movement of said master jaws, and means secured to said master jaw ring for moving it axially.

3. The chuck of claim 2 in which said master ring is unitary and cup-like in shape, and said means for moving said master jaw ring longitudinally is secured to the center rear thereof.

References Cited in the file of this patent

UNITED STATES PATENTS

| | | |
|---|---|---|
| 1,305,138 | McClellan | May 27, 1919 |
| 2,845,276 | Skillin | July 29, 1958 |
| 2,845,277 | Skillin | July 29, 1958 |
| 2,854,240 | Parker | Sept. 30, 1958 |